(12) United States Patent
Nielsen

(10) Patent No.: US 8,239,072 B2
(45) Date of Patent: Aug. 7, 2012

(54) WIND POWER PLANT, WIND POWER PLANT CONTROLLER AND METHOD OF CONTROLLING A WIND POWER PLANT

(75) Inventor: Peter Nielsen, Ferdericia (DK)

(73) Assignee: Vestas Wind Systems A/S, Aarhus (DK)

( * ) Notice: Subject to any disclaimer, the term of this patent is extended or adjusted under 35 U.S.C. 154(b) by 112 days.

(21) Appl. No.: 12/793,241

(22) Filed: Jun. 3, 2010

(65) Prior Publication Data

US 2010/0312410 A1    Dec. 9, 2010

Related U.S. Application Data

(60) Provisional application No. 61/183,573, filed on Jun. 3, 2009.

(30) Foreign Application Priority Data

Jun. 3, 2009   (DK) ................................ 2009 00690

(51) Int. Cl.
*H02P 9/04* (2006.01)

(52) U.S. Cl. .......................................... 700/287; 290/44

(58) Field of Classification Search .................. 700/287; 290/44, 55
See application file for complete search history.

(56) References Cited

U.S. PATENT DOCUMENTS

| 7,606,638 | B2 * | 10/2009 | Fortmann et al. | 700/287 |
| 7,613,548 | B2 * | 11/2009 | Cardinal et al. | 700/286 |
| 7,840,312 | B2 * | 11/2010 | Altemark et al. | 700/286 |
| 8,049,352 | B2 * | 11/2011 | Jorgensen et al. | 290/44 |
| 2008/0174180 | A1 * | 7/2008 | Jurkat et al. | 307/80 |
| 2009/0102196 | A1 | 4/2009 | Altemark et al. | |
| 2010/0305767 | A1 * | 12/2010 | Bengtson | 700/287 |
| 2011/0004356 | A1 * | 1/2011 | Garcia | 700/287 |

FOREIGN PATENT DOCUMENTS

| EP | 1519040 A1 | 3/2005 |
| EP | 1788478 A2 | 5/2007 |
| EP | 1790851 A2 | 5/2007 |
| WO | 2008025357 A1 | 3/2008 |
| WO | 2008025363 A1 | 3/2008 |
| WO | 2008145121 A1 | 12/2008 |

OTHER PUBLICATIONS

Denmark Patent Office, Office Action issued in related Denmark Application No. PA 2009 00690 dated Jan. 13, 2010.

* cited by examiner

*Primary Examiner* — Ryan Jarrett

(74) *Attorney, Agent, or Firm* — Wood, Herron & Evans, LLP

(57) ABSTRACT

A wind power plant, a wind power plant controller and a method of controlling a wind power plant are provided. The method includes a) preparing a telegram comprising wind turbine controlling data for one of the plurality of wind turbines of the wind power plant; b) sending the telegram to the wind turbine upon completion of the telegram; and c) successively repeating steps a) and b) for each of the remaining wind turbines. An initial response time of the wind power plant is shortened; thus, initial response time requirements of the wind power plant specified by grid codes may be fulfilled more easily.

30 Claims, 5 Drawing Sheets

WIND POWER PLANT, WIND POWER PLANT CONTROLLER AND METHOD OF CONTROLLING A WIND POWER PLANT

CROSS-REFERENCE TO RELATED APPLICATIONS

This application claims the benefit of U.S. Provisional Application No. 61/183,573, filed Jun. 3, 2009, and also claims priority under 35 U.S.C. §119(a) to Danish Patent Application No. PA 2009 00690, filed Jun. 3, 2009. The content of each of these documents is incorporated herein by reference in its entirety for all purposes.

TECHNICAL FIELD

The present invention relates generally to a wind power plant, a wind power plant controller and a method of controlling a wind power plant.

BACKGROUND

A wind power plant usually has a plurality of wind turbines for converting wind energy to electricity. To supply electricity to the electricity end users, the wind power plant is connected to a power grid. However, before the wind power plant can be connected to a power grid, the wind power plant has to meet the requirements of electrical performance of the wind power plant specified by grid codes. One requirement is an initial response time of the wind power plant. Generally, the wind power plant has a wind power plant controller which monitors a power grid voltage and compares the power grid voltage with an external setpoint. A difference between the actual power grid voltage and the external setpoint (e.g. an error signal) is used to calculate a command for reactive power production for the wind power plant. This command is sent from the wind power plant controller to the individual wind turbines which in turn will respond (e.g. produce more or less power in order to adjust the power grid voltage) upon receiving the command. The error signal may be caused by a change in the actual power grid voltage or a change in the external setpoint. The initial response time of the wind power plant is to be understood as the time period starting upon detection of a change in the power grid voltage or a change in the external setpoint and ending as soon as the first wind turbine of the plurality of wind turbines of the wind power plant responds (as soon as response is detected).

For example, as shown in a graph 500 of FIG. 5, the British grid code requires an initial response time of not more than 200 ms. That is, the first wind turbine of the wind power plant is required to respond at a time of not more than 200 ms after the time a change in the power grid voltage or a change in the external setpoint takes place, based on the reception of respective control data. The remaining wind turbines of the wind power plant subsequently respond, also based on respective control data. The British grid code requires that, after 1 s, the reactive power production of the wind power plant must be greater than 95% of the required response 502 (e.g. reactive power production).

Generally, control data is sent to a wind turbine only after information about all wind turbines has been collected, the collected information has been processed and the control data for all the wind turbines has been prepared to be sent out. Therefore, the total time for collecting the information about the wind turbines, processing the collected information and generating the control data for all the wind turbines might not meet the requirement of the initial response time specified by the grid codes.

Hence, one objective of the present invention is to avoid the above-mentioned problems.

SUMMARY

According to an embodiment, a method of controlling a wind power plant comprising a plurality of wind turbines is provided. The method includes: a) preparing a telegram comprising wind turbine controlling data for one of the plurality of wind turbines of the wind power plant; b) sending the telegram to the wind turbine upon completion of the telegram; and c) successively repeating steps a) and b) for each of the remaining wind turbines. One effect of this embodiment is that the initial response time of the wind power plant is shortened; thus, initial response time requirements of the wind power plant specified by grid codes may be fulfilled more easily.

According to an embodiment, the wind turbine controlling data includes wind turbine setpoint controlling data.

According to an embodiment, the wind turbine setpoint controlling data includes any one of a group consisting of reactive power production setpoint controlling data and active power production setpoint controlling data.

According to an embodiment, step a) is carried out after having collected status information about the wind turbine. Step a) may be carried out in dependence on the collected status information.

According to an embodiment, the status information collected from the respective wind turbines includes current power output, possible future power output and operating conditions of the respective wind turbines.

According to an embodiment, the telegrams are sent to the respective wind turbines via a wind power plant network.

According to an embodiment, the number of wind turbines of the wind power plant is more than 20.

According to an embodiment, steps a) to c) are carried out on a regular time interval basis ranging between 10 ms and 100 ms.

According to an embodiment, steps a) to c) are carried out on a regular time interval basis ranging between 50 ms and 100 ms.

According to an embodiment, a wind power plant controller is provided. The wind power plant controller is configured to a) prepare a telegram comprising wind turbine controlling data for one of a plurality of wind turbines of a wind power plant; b) send the telegram to the wind turbine upon completion of the telegram; and c) successively repeat steps a) and b) for each of the remaining wind turbines. One effect of this embodiment is that the initial response time of the wind power plant is shortened; thus, initial response time requirements of the wind power plant specified by grid codes may be fulfilled more easily.

According to an embodiment, a wind power plant is provided. The wind power plant includes a plurality of wind turbines; and a wind power plant controller configured to a) prepare a telegram comprising wind turbine controlling data for one of the plurality of wind turbines of the wind power plant; b) send the telegram to the wind turbine upon completion of the telegram; and c) successively repeat steps a) and b) for each of the remaining wind turbines. One effect of this embodiment is that the initial response time of the wind power plant is shortened; thus, initial response time requirements of the wind power plant specified by grid codes may be fulfilled more easily.

According to an embodiment, each wind turbine includes a controller configured to receive the telegram from the wind power plant controller and to send status information about the wind turbine to the wind power plant controller.

According to an embodiment, the wind turbine controlling data includes wind turbine setpoint controlling data.

According to an embodiment, the wind turbine setpoint controlling data includes any one of a group consisting of reactive power production setpoint controlling data and active power production setpoint controlling data.

According to an embodiment, the status information of the respective wind turbines includes current power output, possible future power output and operating conditions of the respective wind turbines.

According to an embodiment, the wind power plant further includes a wind power plant network coupled between the plurality of wind turbines and the wind power plant controller.

According to an embodiment, the wind power plant network is configured to transmit the telegrams from the wind power plant controller to the plurality of wind turbines and to transmit the status information of the plurality of wind turbines to the wind power plant controller.

According to an embodiment, the wind power plant controller is implemented on a Programmable Logic Controller (PLC).

According to an embodiment, the wind power plant controller includes communication modules configured to send the telegrams to the respective wind turbines.

According to an embodiment, the number of wind turbines of the wind power plant is more than 20.

According to an embodiment, steps a) to c) are carried out on a regular time interval basis ranging between 10 ms and 100 ms.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which.

DETAILED DESCRIPTION

Exemplary embodiments of a wind power plant, a wind power plant controller and a method of controlling a wind power plant in accordance with the present invention will be described in detail below with reference to the accompanying figures. It will be appreciated that the exemplary embodiments described below can be modified in various aspects without changing the essence of the invention.

Figure 1:
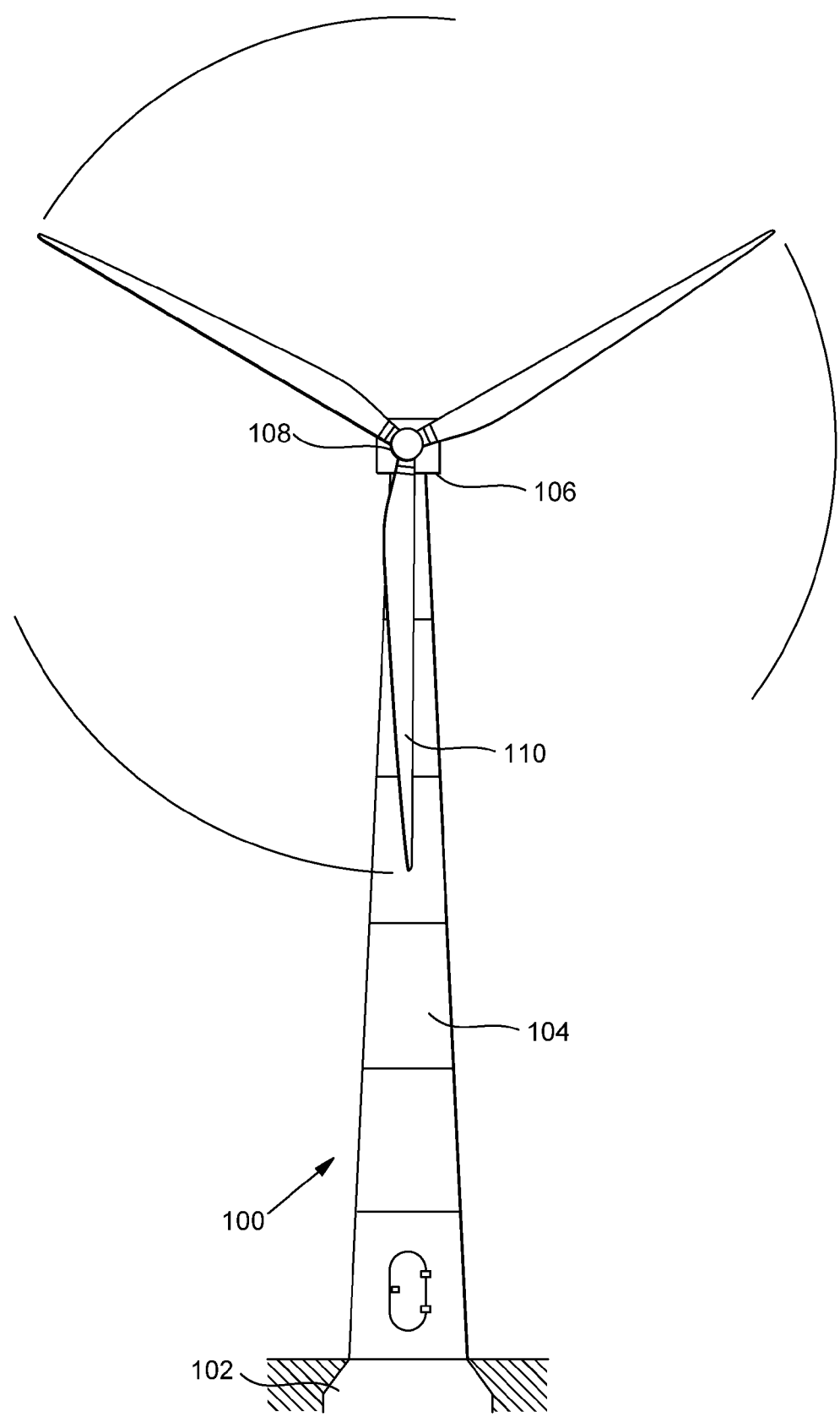
FIG. 1 illustrates a common setup of a conventional wind turbine.

FIG. 1 illustrates a common setup of a conventional wind turbine 100. The wind turbine 100 is mounted on a base 102. The wind turbine 100 includes a tower 104 having a number of towers sections, such as tower rings. A wind turbine nacelle 106 is placed on top of the tower 104. The wind turbine rotor includes a hub 108 and at least one rotor blade 110, e.g. three rotor blades 110. The rotor blades 110 are connected to the hub 108 which in turn is connected to the nacelle 106 through a low speed shaft which extends out of the front of the nacelle 106.

Figure 2:
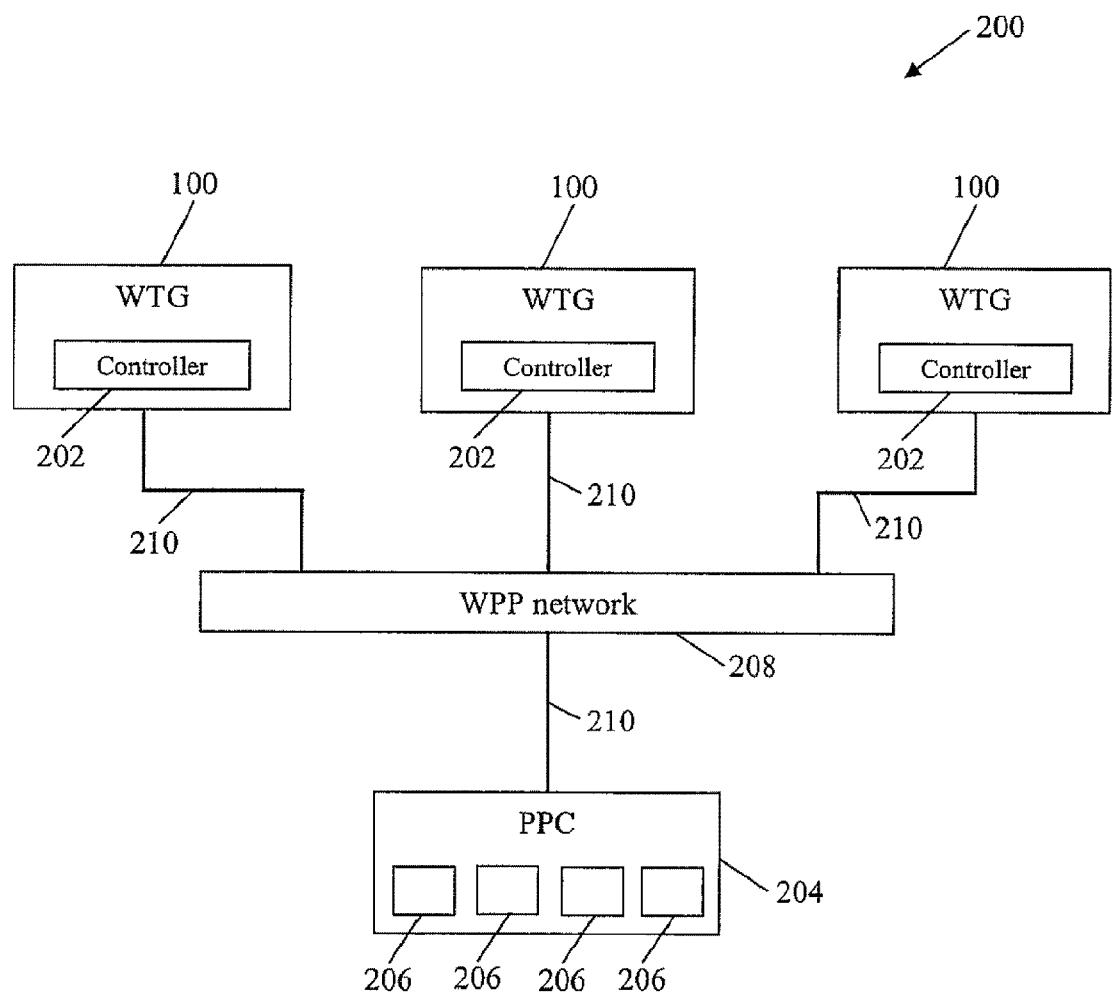
FIG. 2 shows a schematic diagram of a wind power plant according to an embodiment of the present invention.

FIG. 2 shows a schematic diagram of a wind power plant 200 (also known as "wind farm" or "wind park") according to an embodiment of the present invention. In FIG. 2, the wind power plant 200 includes a plurality of wind turbines 100. The number of wind turbines 100 of the wind power plant 200 can be more than 20. However, it is to be understood that the term "wind power plant" in the sense of the present invention may also include the case of at least two wind turbines.

In one embodiment, each wind turbine 100 of the wind power plant 200 may include a controller 202 located within the wind turbine 100, e.g. in the tower 104 or in the nacelle 106. Alternatively, the controller 202 may be located outside the wind turbine 100. The controller 202 of each wind turbine 100 is configured to receive a telegram and to send status information about the respective wind turbine 100. The controller 202 may also be configured to control all functions of the respective wind turbine 100. Alternatively, each wind turbine 100 may include a separate controller 202 configured to control all functions of the respective wind turbine 100.

The wind power plant 200 includes a wind power plant controller (PPC) 204. The wind power plant controller 204 may for example be implemented on a Programmable Logic Controller (PLC). The wind power plant 200 includes a plurality of communication modules 206. The communication modules 206 may be EWEB modules. However, also other communication modules may be used. The communication modules 206 are integrated into the wind power plant controller 204.

The wind power plant 200 also includes a wind power plant (WPP) network 208. The WPP network 208 is coupled between the wind turbines 100 and the wind power plant controller 204 via control lines 210.

In the wind power plant 200, all the wind turbines 100 can communicate with the wind power plant controller 204 through the WPP network 208. For example, the wind turbines 100 may be configured to send status information about the wind turbines 100 to the wind power plant controller 204 via the WPP network 208 using the respective controllers 202. The status information about the wind turbines 100 may be sent to the wind power plant controller 204 only upon request by the wind power plant controller 204. Alternatively, the status information about the wind turbines 100 may be sent to the wind power plant controller 204 at a regular time interval basis. For example, a possible time interval range may be about 10 ms to about 100 ms.

In one embodiment, the status information sent from the wind turbines 100 to the wind power plant controller 204 indicates if the respective wind turbines 100 are in an operating mode, are tripped or are starting up. The status information may for example include current power output and/or possible future power output of the respective wind turbines. The possible power outputs of the respective wind turbines generally depend on the wind speed. The status information may also include general operating conditions of the respective wind turbines 100, e.g. temperature of e.g. a motor of the wind turbine 100, grid voltage, etc.

The wind power plant controller 204 in response controls the wind turbines 100 via the WPP network 208. The wind power plant controller 204 may also control components such as switchgears, motors, etc in the wind turbines 100. After receiving the status information about the wind turbines 100, the wind power plant controller 204 prepares a telegram for each wind turbine 100 comprising corresponding wind turbine controlling data based on the status information received from the respective wind turbine 100, and sends each telegram to the corresponding wind turbine 100 via the WPP network 208. The wind power plant controller 204 may be configured to prepare a telegram for a chosen wind turbine 100 of the wind power plant 200 and to send the telegram to the chosen wind turbine 100 upon completion of the telegram. The wind power plant controller 204 may be configured to successively repeat the same process for each of the remaining wind turbines 100. That is, the next telegram is prepared after having sent out the previous telegram. The wind power plant controller 204 may work based on a discrete time sampled system. It is understood that in a discrete time sampled system, a continuous signal is being read at a fixed time interval (Ts). The value of the continuous signal is represented by its instantaneous value at the respective time instants Ts, 2 Ts, 3 Ts, 4 Ts, . . . , KTs. The instantaneous values of the continuous signal at the respective time instants Ts, 2 Ts, 3 Ts, 4 Ts, . . . , KTs is named sample nos. 1, 2, 3, 4, . . . , K respectively. That is, the wind power plant controller 204 can start to prepare the telegram for a chosen wind turbine N+1 while the telegram for a previous chosen wind turbine N is being sent by the communication modules 206. More generally, while the communication modules are handling the sending of telegrams which have been prepared based on power plant controller sample #K, the power plant controller may itself start calculating the setpoints for power plant controller sample #K+1.

The wind power plant controller 204 prepares and sends one telegram to each wind turbine 100. In another embodiment, the wind power plant controller 204 may prepare and send more than one telegram to each wind turbine 100. The control information included within the telegrams may be the same for all telegrams. Alternatively, control data may differ from telegram to telegram, i.e. each wind turbine may receive individual control data.

The telegram for each wind turbine 100 can be sent out on a regular time interval basis ranging between about every 10 ms to about 100 ms. The telegram for each wind turbine 100 may be sent to the respective wind turbines 100 by the communication modules 206 which control the sending process. In the event that the wind power plant 200 has a large number of wind turbines 100, each communication module 206 is configured to send the telegrams to a respective group of wind turbines 100 in the wind power plant 200. For example, if the wind power plant 200 has twenty-four wind turbines 100 and three communication modules 206, the twenty-four wind turbines 100 may be equally distributed among the three communication modules such that each communication module 206 controls telegram communication between the wind power plant controller 204 and a respective group of e.g. eight wind turbines of the wind power plant 200.

It is understood that it is not necessary to distribute the number of wind turbines 100 equally among the number of communication modules 206. Some communication modules 206 may be configured to send the telegram to a larger number of wind turbines 100 than other communication modules 206. The number of wind turbines 100 for each communication module 206 may be manually adjusted by a user, or may be automatically determined by a software program.

The telegrams sent from the wind power plant controller 204 to the respective wind turbines 100 may be data packets/concatenation of data packets. The data packets/concatenation of data packets may be sent using Ethernet IP network technology. However, also other network technology types may be used for sending the data packets. In one embodiment, the wind turbine controlling data of the telegram includes wind turbine setpoint controlling data. The wind turbine setpoint controlling data can include reactive power production setpoint controlling data only, active power production setpoint controlling data only, or both reactive power production setpoint controlling data and active power production setpoint controlling data.

The respective controllers 202 of the wind turbines 100 are also configured to receive telegrams from the wind power plant controller 204. Upon receiving the telegrams, the wind turbines 100 may adjust the existing reactive power production setpoint and the existing active power production setpoint based on the reactive power production setpoint controlling data and the active power production setpoint controlling data in the telegrams, if the existing reactive power production setpoint and the existing active power production setpoint of the wind turbines 100 are different from the reactive power production setpoint controlling data and the active power production setpoint controlling data in the telegrams. It is to be understood that generally the wind turbines 100 should be in an operating mode before the wind turbines 100 can respond to controlling data like the reactive power production setpoint controlling data and the active power production setpoint controlling data in the telegrams.

Figure 3:
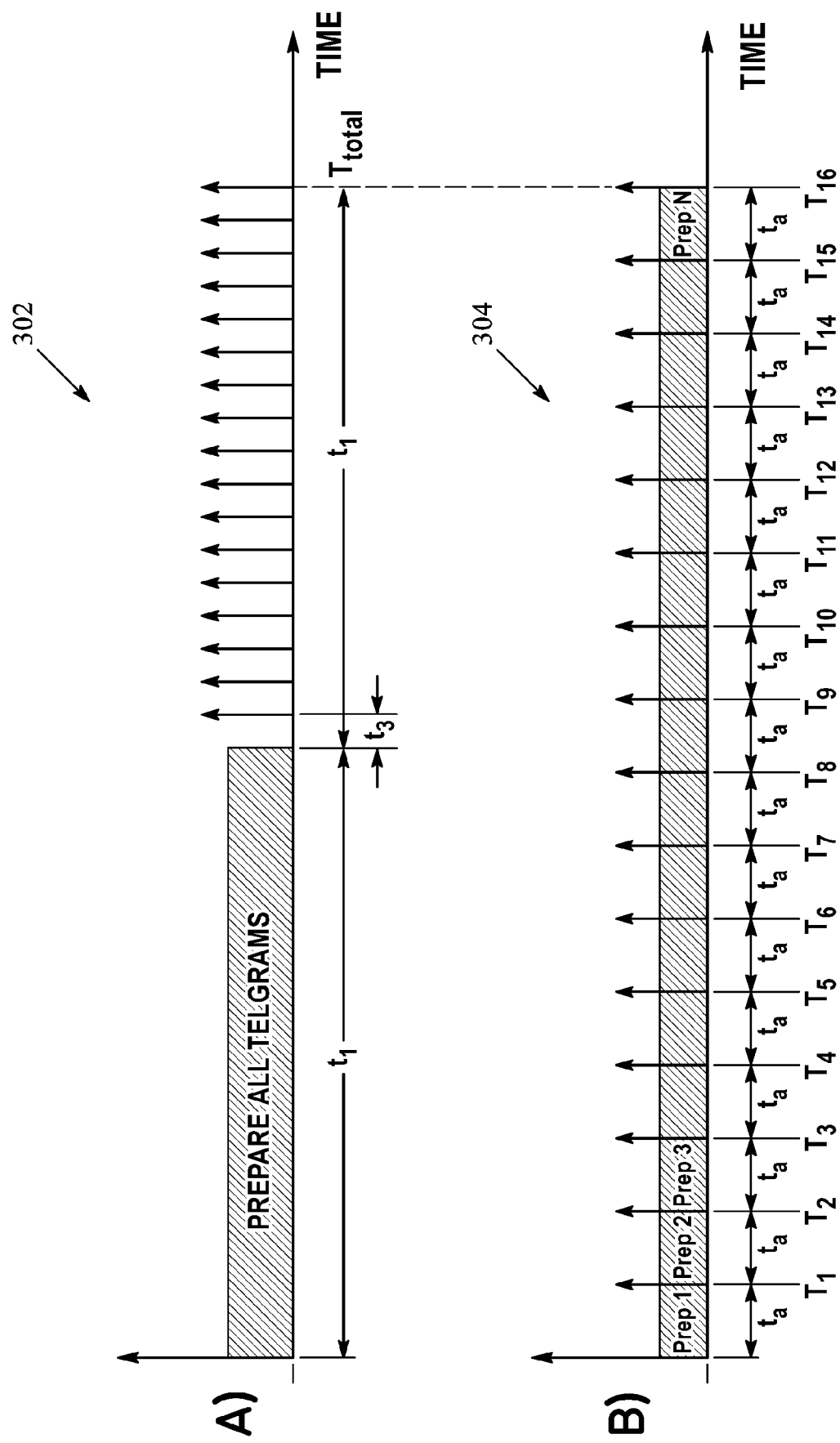
FIG. 3a shows a conventional sequence of preparation and transmission of telegrams.
FIG. 3b shows a sequence of preparation and transmission of telegrams according to an embodiment of the present invention.

FIG. 3a shows a conventional sequence 302 of preparation and transmission of telegrams by the wind power plant controller 204. Based on the conventional sequence 302, the wind power plant controller 204 prepares all telegrams for all wind turbines 100 to be controlled in a time interval $t_1$ and sends the telegrams to the respective wind turbines 100 in a time interval $t_2$ after all telegrams have been prepared and are ready to be sent out. The total time taken to prepare and to send all the telegrams is $T_{total}$.

A wind power plant using the conventional sequence 302 shown in FIG. 3a may not meet the requirements of the grid codes relating to an initial response time of the wind power plant. The initial response time of the wind power plant using the conventional sequence 302 may be a sum of the time taken to prepare all telegrams (i.e. $t_1$), the time taken to send out the first telegram (i.e. $t_3$) and the time taken for a first wind turbine receiving the first telegram to respond to the control information included within the first telegram. To meet the requirement of the grid codes, the number of wind turbines of the wind power plant may have to be reduced to achieve a faster initial response time. However, higher costs may be incurred if another wind power plant needs to be set up to meet the electricity demand.

FIG. 3b shows a sequence 304 of preparation and transmission of telegrams by the wind power plant controller 204 according to an embodiment of the present invention. Using the sequence 304 shown in FIG. 3b, the wind power plant controller 204 prepares a telegram including wind turbine controlling data for a first wind turbine 100 in a time interval $t_a$ and sends the telegram to the wind turbine 100 at time $T_1$ upon completion of the telegram. The first wind turbine 100 to receive a telegram is determined by the communication modules 206 and can be changed using a software program. More generally, the order based on which the plurality of wind turbines receive the telegrams can be changed using a software program. The wind power plant controller 204 then proceeds to prepare a telegram for a second wind turbine 100 after sending the telegram for the first wind turbine 100. The telegram for the second wind turbine 100 is sent out at time $T_2$ upon completion of the telegram. This process continues until all the wind turbines 100 in the wind power plant 200 receive the respective telegrams. This process is carried out on a regular time interval basis ranging between about 10 ms and about 100 ms.

As shown in FIG. 3b, the time interval taken for preparing the telegrams for each wind turbine 100 is the same (e.g. $t_a$ for each wind turbine 100). However, depending on the individual control information included within each telegram, the time interval taken for preparing the telegrams may differ from telegram to telegram. The telegrams are successively sent out at time $T_1, T_2, \ldots, T_{16}$ respectively.

Comparing FIGS. 3a and 3b, the total time taken for the sequence shown in FIG. 3b to prepare and to send all the telegrams is about the same as the total time taken for the conventional sequence 302 shown in FIG. 3a. Therefore, using the sequence 304 shown in FIG. 3b does not result in a total processing time which is longer, as compared to using the conventional sequence 302 shown in FIG. 3a.

Further, using the sequence shown in FIG. 3b can minimize initial control delay (i.e. initial response time) of the wind power plant 200 and thus achieving a faster response time, since the telegram for the first wind turbine 100 is sent as soon as it is ready. The initial response time of the wind power plant 200 using the sequence 304 may be a sum of the time taken to prepare and send the first telegram (i.e. $T_1$) and the time taken for a first wind turbine 100 to respond to the control information included within the first telegram. Comparing the initial response time of the conventional sequence 302 and the initial response time of the sequence 304, the wind power plant 200 using the sequence 304 has a faster initial response time.

In addition, with e.g. eight wind turbines 100 on each communication module 206 and using the sequence 304, the first wind turbine 100 of each communication 206 may receive the telegram after about 3 to 5 ms after having started preparing the telegram for the first wind turbine, and the last wind turbine 100 of each communication 206 may receive the telegram after about 25 to 30 ms after having started preparing the telegram for the first wind turbine. Thus, according to one embodiment, the initial response time of the wind power plant 200 may be regarded as a sum of the following time periods: one sample period of the wind power plant controller 204 for calculating new setpoint controlling data included with the telegram for the first wind turbine 100, the time taken for the first wind turbine 100 to receive the telegram (e.g. about 3 to 5 ms) and a communication delay of the first wind turbine 100 to respond to the setpoint controlling data included within the received telegram. Therefore, the wind power plant 200 having a large number of wind turbines 100 can still meet the requirement of the grid codes relating to an initial response time of the wind power plant 200.

Figure 5:
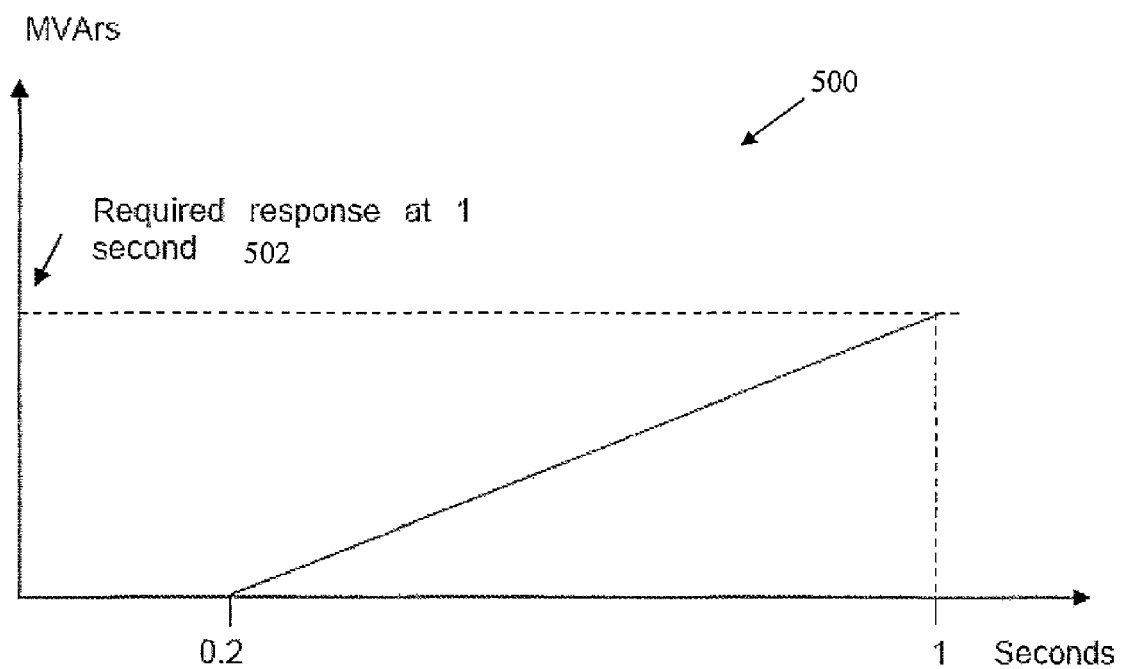
FIG. 5 shows a graph illustrating a requirement of an initial response time of a wind power plant specified by the British grid code.

In one embodiment, it may be possible for the wind power plant 200 to use a sequence which is a combination of the conventional sequence 302 and the sequence 304. Assuming that for example six wind turbines 100 of the wind power plant 200 can achieve the required response 502 shown in FIG. 5, the telegrams for six wind turbines 100 of the wind power plant 200 can first be prepared and sent using the sequence 304, and the telegrams for the remaining wind turbines 100 of the wind power plant 200 can then be prepared and sent using the conventional sequence 302. More generally, according to one embodiment, the wind power plant controller 204 may determine how many wind turbines 100 are necessary to be controlled according to embodiments of the present invention in order to achieve the required response. Then, these wind turbines 100 may be controlled accordingly (using the sequence 304). All remaining wind turbines may be controlled using the conventional sequence 302.

Figure 4:
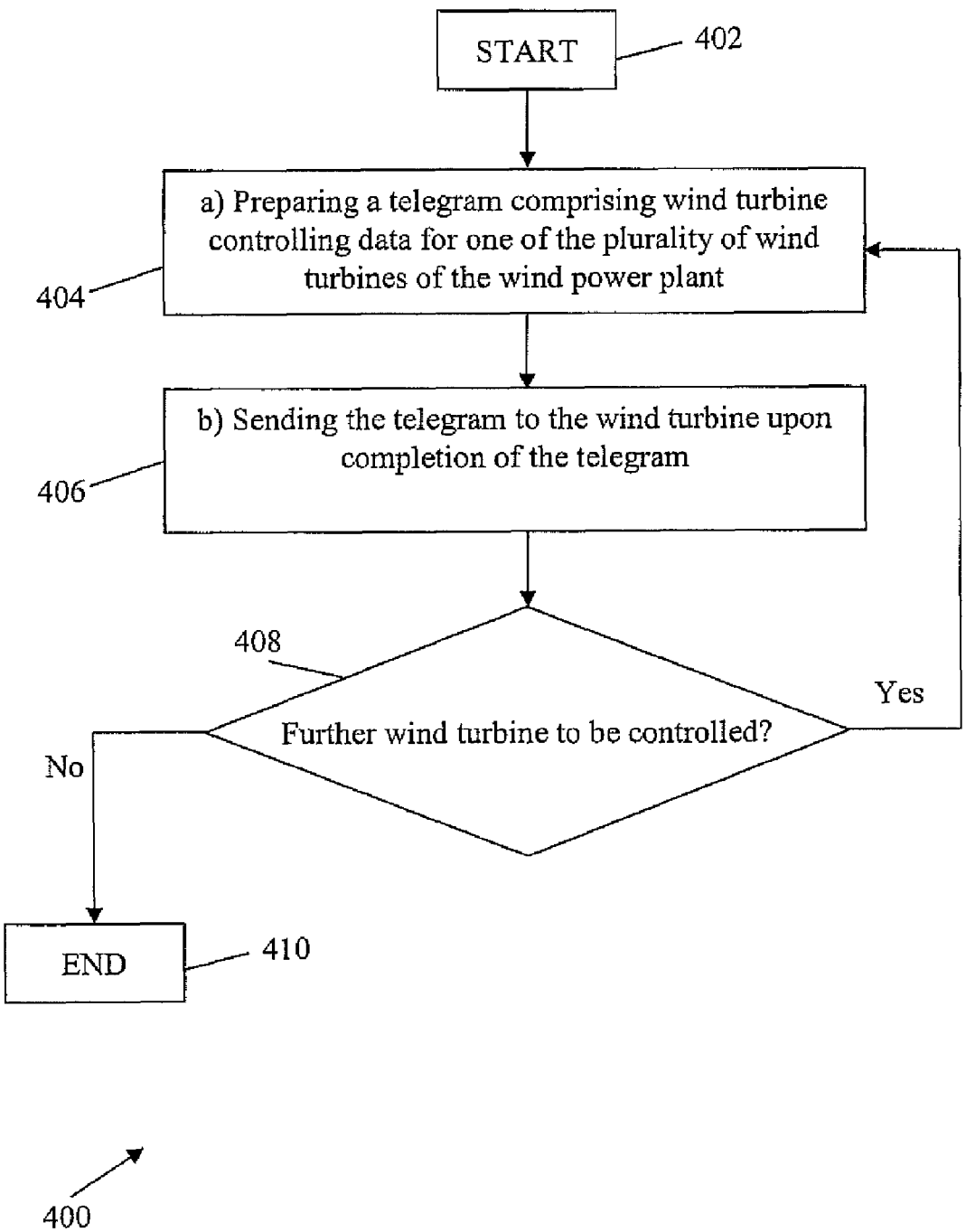
FIG. 4 shows a flowchart of an embodiment of controlling a wind power plant according to the present invention.

FIG. 4 show a flowchart 400 of an embodiment of controlling a wind power plant according to the present invention. At 402, a process of successively preparing and sending a telegram to each of the plurality of wind turbines of the wind power plant starts. At 404, a telegram having wind turbine controlling data for one of the plurality of wind turbines of the wind power plant is prepared. At 406, the telegram is sent to the wind turbine upon completion of the telegram. At 408, it is checked if there is any remaining wind turbine to which a corresponding telegram has not been sent. If there is, a telegram comprising wind turbine controlling data is prepared for the remaining wind turbine at 404, and the telegram is sent to the remaining wind turbine upon completion of the telegram at 406. This iterative process is successively repeated for each of the remaining wind turbines. If all wind turbines of the wind power plant have received a corresponding telegram, the process ends at 410.

While embodiments of the invention have been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A method of controlling a wind power plant comprising a plurality of wind turbines, the method comprising:
    a) preparing a telegram comprising wind turbine controlling data for one of the plurality of wind turbines of the wind power plant;
    b) sending the telegram to the wind turbine upon completion of the telegram; and
    c) successively repeating steps a) and b) for each of the remaining wind turbines,
    wherein the wind turbine controlling data comprises any one of a group consisting of reactive power production setpoint controlling data and active power production setpoint controlling data,
    wherein a next telegram is prepared for another of the plurality of wind turbines in response to having sent out the prepared telegram to the one of the plurality of wind turbines.

2. The method of claim 1, wherein step a) is carried out after having collected status information about the wind turbine, wherein step a) is carried out in dependence on the collected status information.

3. The method of claim 2, wherein the status information collected from the respective wind turbines comprises any one of a group consisting of current power output, possible future power output and operating conditions of the respective wind turbines.

4. The method of claim 1, wherein the telegrams are sent to the respective wind turbines via a wind power plant network.

5. The method of claim 1, wherein the number of wind turbines of the wind power plant is more than 20.

6. The method of claim 1, wherein steps a) to c) are carried out on a regular time interval basis ranging between 10 ms and 100 ms.

7. A wind power plant, comprising:
a plurality of wind turbines; and
a wind power plant controller configured to:
   a) prepare a telegram comprising wind turbine controlling data for one of the plurality of wind turbines of the wind power plant;
   b) send the telegram to the wind turbine upon completion of the telegram; and
   c) successively repeat steps a) and b) for each of the remaining wind turbines,
wherein the wind turbine controlling data comprises any one of a group consisting of reactive power production setpoint controlling data and active power production setpoint controlling data; and
the wind power plant controller is further configured to prepare a next telegram for another of the plurality of wind turbines in response to having sent out the prepared telegram to the one of the plurality of wind turbines.

8. The wind power plant of claim 7, wherein each wind turbine comprises a controller configured to receive the telegram from the wind power plant controller and to send status information about the wind turbine to the wind power plant controller.

9. The wind power plant of claim 8, wherein the status information of the respective wind turbines comprises any one of a group consisting of current power output, possible future power output and operating conditions of the respective wind turbines.

10. The wind power plant of claim 7, further comprising:
   a wind power plant network coupled between the plurality of wind turbines and the wind power plant controller.

11. The wind power plant of claim 10, wherein the wind power plant network is configured to transmit the telegrams from the wind power plant controller to the plurality of wind turbines and to transmit the status information of the plurality of wind turbines to the wind power plant controller.

12. The wind power plant of claim 7, wherein the wind power plant controller is implemented on a Programmable Logic Controller (PLC).

13. The wind power plant of claim 7, wherein the wind power plant controller comprises communication modules configured to send the telegrams to the respective wind turbines.

14. The wind power plant of claim 7, wherein the number of wind turbines of the wind power plant is more than 20.

15. The wind power plant of claim 7, wherein steps a) to c) are carried out on a regular time interval basis ranging between 10 ms and 100 ms.

16. A method of controlling a wind power plant comprising a plurality of wind turbines, the method comprising:
   a) preparing a telegram comprising wind turbine controlling data for one of the plurality of wind turbines of the wind power plant;
   b) sending the telegram to the wind turbine upon completion of the telegram; and
   c) successively repeating steps a) and b) for each of the remaining wind turbines,
wherein the wind turbine controlling data comprises any one of a group consisting of reactive power production setpoint controlling data and active power production setpoint controlling data,
wherein a next telegram is prepared for another of the plurality of wind turbines while sending the prepared telegram to the one of the plurality of wind turbines.

17. The method of claim 16, wherein step a) is carried out after having collected status information about the wind turbine, wherein step a) is carried out in dependence on the collected status information.

18. The method of claim 17, wherein the status information collected from the respective wind turbines comprises any one of a group consisting of current power output, possible future power output and operating conditions of the respective wind turbines.

19. The method of claim 16, wherein the telegrams are sent to the respective wind turbines via a wind power plant network.

20. The method of claim 16, wherein the number of wind turbines of the wind power plant is more than 20.

21. The method of claim 16, wherein steps a) to c) are carried out on a regular time interval basis ranging between 10 ms and 100 ms.

22. A wind power plant, comprising:
a plurality of wind turbines; and
a wind power plant controller configured to:
   a) prepare a telegram comprising wind turbine controlling data for one of the plurality of wind turbines of the wind power plant;
   b) send the telegram to the wind turbine upon completion of the telegram; and
   c) successively repeat steps a) and b) for each of the remaining wind turbines,
wherein the wind turbine controlling data comprises any one of a group consisting of reactive power production setpoint controlling data and active power production setpoint controlling data; and
wherein the wind power plant controller is further configured to prepare a next telegram for another of the plurality of wind turbines while sending the prepared telegram to the one of the plurality of wind turbines.

23. The wind power plant of claim 22, wherein each wind turbine comprises a controller configured to receive the telegram from the wind power plant controller and to send status information about the wind turbine to the wind power plant controller.

24. The wind power plant of claim 23, wherein the status information of the respective wind turbines comprises any one of a group consisting of current power output, possible future power output and operating conditions of the respective wind turbines.

25. The wind power plant of claim 22, further comprising:
   a wind power plant network coupled between the plurality of wind turbines and the wind power plant controller.

26. The wind power plant of claim 25, wherein the wind power plant network is configured to transmit the telegrams from the wind power plant controller to the plurality of wind turbines and to transmit the status information of the plurality of wind turbines to the wind power plant controller.

27. The wind power plant of claim 22, wherein the wind power plant controller is implemented on a Programmable Logic Controller (PLC).

28. The wind power plant of claim 22, wherein the wind power plant controller comprises communication modules configured to send the telegrams to the respective wind turbines.

29. The wind power plant of claim 22, wherein the number of wind turbines of the wind power plant is more than 20.

30. The wind power plant of claim 22, wherein steps a) to c) are carried out on a regular time interval basis ranging between 10 ms and 100 ms.

* * * * *